United States Patent [19]
Blevins et al.

[11] Patent Number: 5,479,867
[45] Date of Patent: Jan. 2, 1996

[54] ROTARY TABLE

[76] Inventors: Bruce D. Blevins, 1259 E. Windsor Ave., Bristol, Tenn. 37620; Richard A. Souder, P.O. Box 695, Bluff City, Tenn. 37618

[21] Appl. No.: 134,655
[22] Filed: Oct. 12, 1993
[51] Int. Cl.$^6$ ............................................. A47B 57/00
[52] U.S. Cl. ......................... 108/94; 108/22; 240/349.1
[58] Field of Search ................................. 108/20, 21, 22, 108/94, 103, 139; 248/349, 131

[56] References Cited

U.S. PATENT DOCUMENTS

| | | | |
|---|---|---|---|
| 327,032 | 9/1885 | Stevens | 108/139 |
| 549,997 | 11/1895 | Dibble | 108/139 |
| 1,396,246 | 11/1921 | Bouvier | 108/139 |
| 1,732,113 | 10/1929 | van der Meer . | |
| 1,941,906 | 1/1934 | Marinsky | 108/103 X |
| 3,179,070 | 4/1965 | Beller | 108/103 |
| 3,302,594 | 2/1967 | Barnett et al. . | |
| 3,636,299 | 1/1972 | Stewart, Jr. | 108/94 X |
| 4,566,664 | 1/1986 | Donald . | |
| 4,625,007 | 11/1986 | Jorgenson | 108/20 X |
| 4,635,894 | 1/1987 | Sammons | 108/103 X |
| 4,694,132 | 9/1987 | Liu | 108/20 X |
| 4,746,781 | 5/1988 | Dacquist, III et al. | 108/20 X |
| 4,946,127 | 8/1990 | Kulaga . | |
| 4,969,290 | 11/1990 | Skoretz . | |
| 5,080,322 | 1/1992 | Harley | 108/103 X |
| 5,149,043 | 9/1992 | Grundmann . | |

*Primary Examiner*—Jose V. Chen
*Attorney, Agent, or Firm*—Shoemaker and Mattare, Ltd.

[57] ABSTRACT

A rotary table for supporting items within an enclosure includes a base having a planar top surface, a central through hole, and a radially extending circumferential flange, and a bearing retainer having a central through hole and an array of barrel-shaped recesses defined therein, arranged on plural concentric circles. Each of the recesses loosely contains a captive ball which partly protrudes from both top and bottom ends of the recess, each ball bearing against the top surface of the base. A rotatable plate is supported by the balls, and retained with respect to the base by a central post that extends downwardly through the central holes in both the retainer and the base. The ball retainer and the base have similar polar arrays of reinforcing ribs, to provide a strong but lightweight unit.

8 Claims, 3 Drawing Sheets ized by the following claims.
ROTARY TABLE

BACKGROUND OF THE INVENTION

This invention relates generally to planar supports, and more particularly to a rotary table which may be used to support materials in closed spaces such as refrigerators, cabinets, storage bins and display racks.

Lazy-susan devices have of course been known for many years. They provide convenient access to an array or articles on their surface, and can be easily rotated to facilitate access to the articles. A typical lazy susan has upper and lower plates, each with grooves in which balls roll freely; the device acts as a large thrust bearing. Devices of this type has some potential drawbacks. For one thing, the ball locus is generally a circle whose diameter is substantially less than the diameter of the device, so placing a heavy load near the edge of the device can tilt the upper plate. Additionally, since the balls are free, they can rub together, and are easily fouled with particulate matter and the like.

SUMMARY OF THE INVENTION

An object of the invention is to provide a simple, compact, lightweight and inexpensive, yet strong and reliable, rotary table.

Another object of the invention is to prevent contamination of the bearings in a rotary table.

These and other objects are attained by a rotary table for supporting items within an enclosure includes a base having a planar top surface, a central through hole, and a radially extending circumferential flange, and a bearing retainer having a central through hole and an array of barrel-shaped recesses defined therein, arranged on plural concentric circles. Each of the recesses loosely contains a captive ball which partly protrudes from both top and bottom ends of the recess, each ball bearing against the top surface of the base. A rotatable plate is supported by the balls, and retained with respect to the base by a central post that extends downwardly through the central holes in both the retainer and the base. The ball retainer and the base have similar polar arrays of reinforcing ribs, to provide a strong but lightweight unit.

BRIEF DESCRIPTION OF THE DRAWINGS

In the accompanying drawings.

DESCRIPTION OF THE PREFERRED EMBODIMENT

Figure 1:
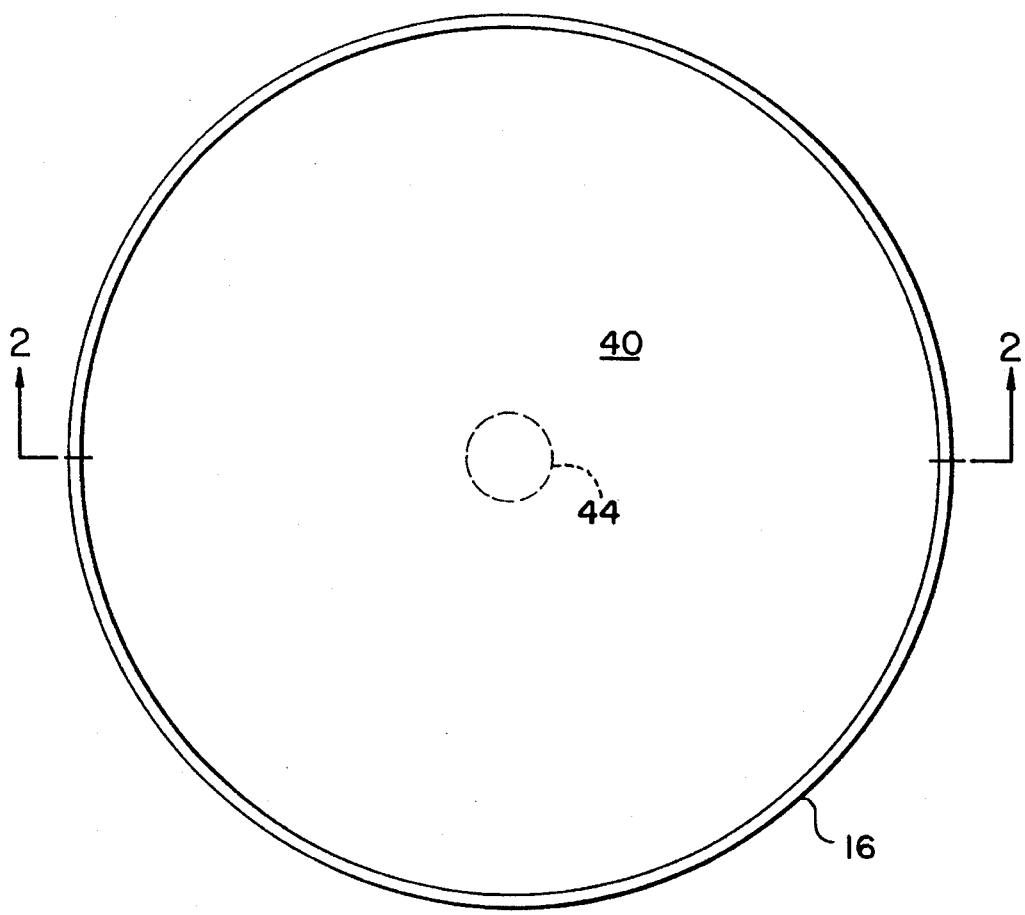
FIG. 1 is a top plan view of a rotary table embodying the invention.
Figure 2:
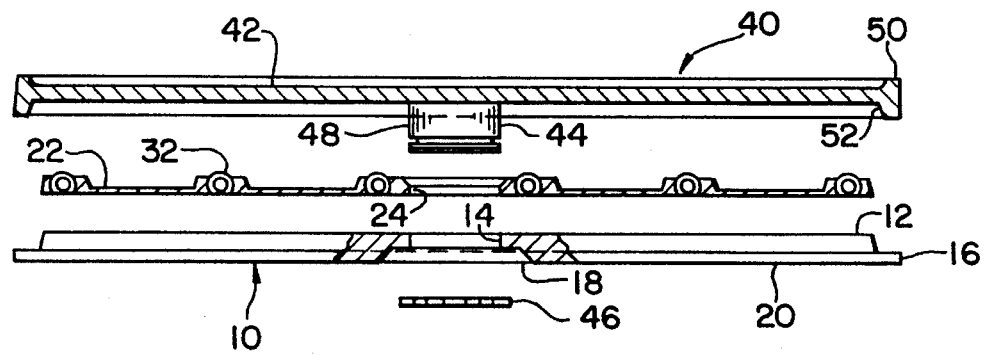
FIG. 2 is an exploded sectional view taken on a vertical plane denoted by line 2—2 in FIG. 1.
Figure 3:
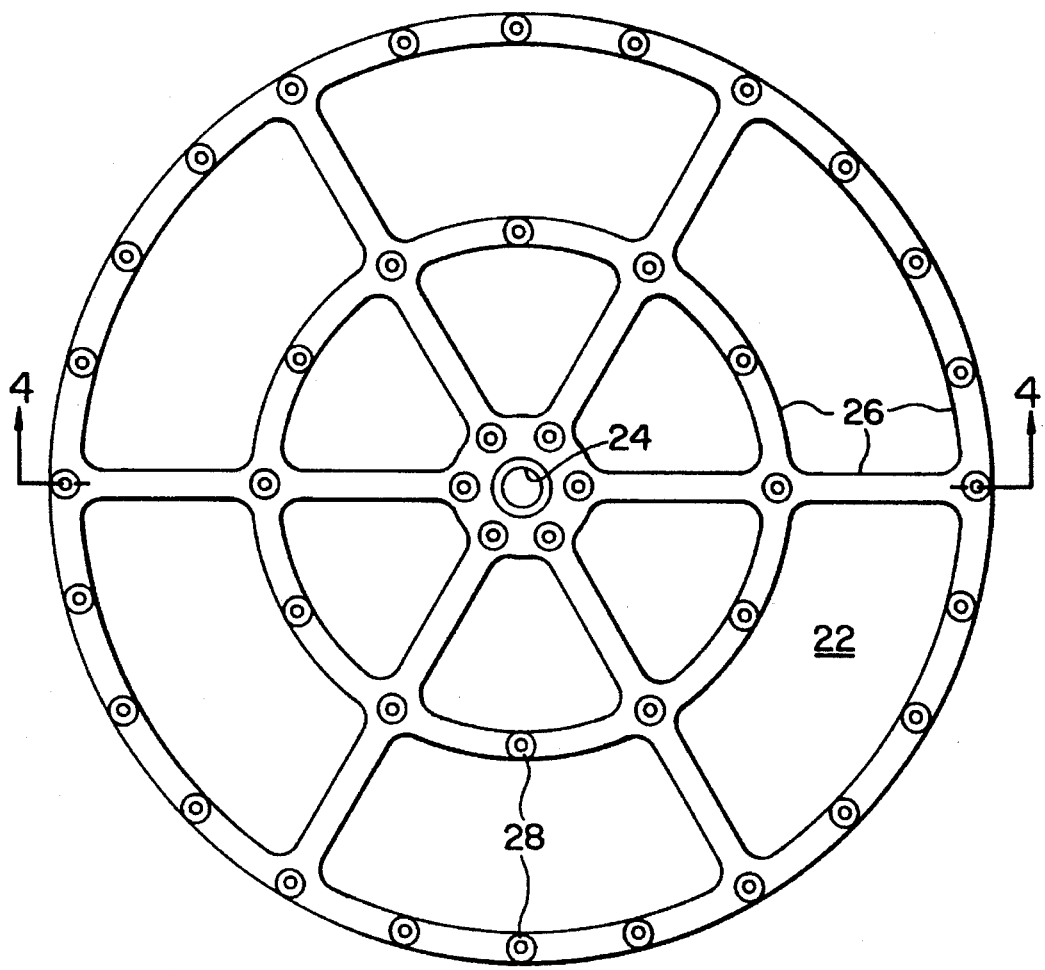
FIG. 3 is a top plan view of the bearing assembly of the table.
Figure 6:
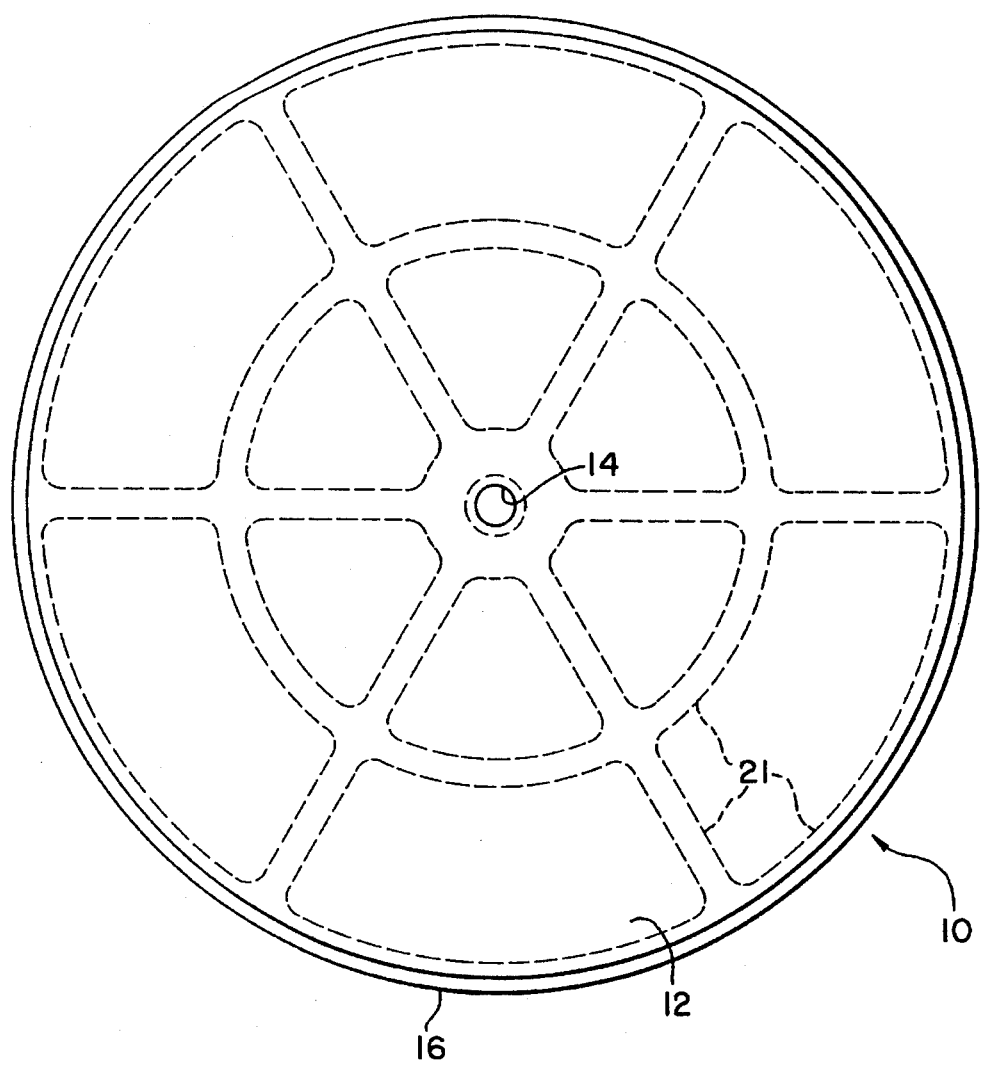
FIG. 6 is a top plan view of the base of the table.
Figure 7:
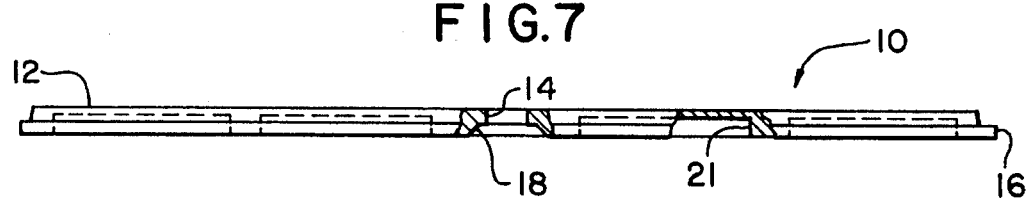
FIG. 7 is a sectional view taken on a vertical plane denoted by line 7—7 in FIG. 6.

A rotary table embodying the invention includes a circular base 10 (FIGS. 2, 6 and 7) having a flat upper surface 12 with a central through hole 14. A circumferential flange 16 extends radially outward from the base, below the level of the surface 12. A central circular relief 18 in the bottom 20 of the base surrounds the hole 14. The surface 12 is reinforced below by an array of radial and concentric ribs 21, whose arrangement is best seen in FIG. 6.

The bearing retainer 22 (FIGS. 2–5) situated above the base also has a central hole 24, similar in size to hole 14. The nominal thickness of the retainer is small; however, it is reinforced by an array of upwardly protruding radial and concentric ribs 26, whose arrangement is substantially the same as those of the base. Compare FIGS. 2 and 6. A polar array of recesses 28 are formed in the ribs. The array can be thought of as including concentric circles, with each outer circle having more recesses than its neighboring inner circle, to preserve a fairly constant circumferential spacing between recesses.

Figure 5:
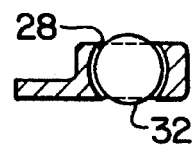
FIG. 5 is an enlarged detail of a portion of FIG. 4.
Figure 4:
FIG. 4 is a sectional view taken on a vertical pane denoted by line 4—4 in FIG. 3.

One of the recesses 28 is shown in detail in FIG. 5. The surface of the recess defines a barrel-shaped cavity into which a ball 32 is pressed. The recess is somewhat bigger than the ball, so that while the ball is held captive, it can rotate freely, normally without a lubricant, and protrudes from both ends of the recess.

The retainer is covered and concealed by a top plate 40 having a flat bottom surface 42 supported by the balls 32, and a central post 44 extending downwardly through the central holes 14, 24 in both the retainer and the base. When the parts are assembled, an external snap ring 46 is placed in a groove 48 near the bottom of the post. The snap ring, abutting the top of the relief 18, thereafter keeps the parts assembled, but permits disassembly for cleaning, if necessary. The periphery of the plate 40 has an upwardly extending rim 50, and a downwardly extending skirt 52, which surrounds and conceals the bearing retainer when the device is assembled.

The table described above may be used by placing it in an enclosure in which parts or commodities are stored. The flange 16, which extends outward from the base, prevents the movable top from rubbing against adjacent walls and the like by acting as a standoff. Should small amounts of loose or liquid material be spilled on the top, the rim helps retain the spill on the plate. And in the event that material does spill over the rim, the skirt keeps the material away from the ball bearings.

It is anticipated that the three major components of the device (base, retainer and top plate) may each be best manufactured by injection molding from a high-impact polymeric material; however, certain applications may dictate the use of metal or other materials for one or more components, depending on the loading requirements of the device, and the temperature and chemical environment to which it is apt to be exposed.

The device shown may be scaled up or down, but to give an idea of proportions: the preferred device has a top plate diameter of fifteen inches, and an overall height of about 9/16 inch. The post for this unit is an inch and a half in diameter, and the preferred ball diameter is 3/16 inch.

Since the invention is subject to modifications and variations, it is intended that the foregoing description and the accompanying drawings shall be interpreted as illustrative of only one form of the invention, whose scope is to be measured by the following claims.

We claim:

1. A rotary table comprising a base having a planar top surface, a central through hole, and a radially extending circumferential flange;

a bearing retainer having a central through hole and an array of recesses defined therein, arranged on plural concentric circles, wherein said recesses are arranged in at least three concentric circles, each circle having more recesses than its inwardly neighboring circle;

each of said recesses loosely containing a captive ball which is pressed into the recess and partly protrudes from both top and bottom ends of the recess, each said ball bearing against the top surface of the base;

a top plate having a flat bottom surface supported by said balls, and a central post extending downwardly through the central holes in both the retainer and the base; and means for retaining said post in said central holes.

2. The invention of claim 1, wherein the top plate has a peripheral skirt extending downwardly around said retainer and above the circumferential flange of the base.

3. The invention of claim 1, wherein the top plate has a rim extending upwardly from the periphery of the plate, to retain objects and liquids spilled upon the top plate.

4. The invention of claim 1, wherein each of said recesses is barrel-shaped.

5. The invention of claim 1, wherein the base has a relief in its lower surface, around its central hole, the post has an external circumferential groove level with the relief, and the retaining means is a snap ring which seats in the groove and extends into the relief.

6. The invention of claim 1, wherein the base has concentric circular reinforcing ribs underneath its top surface, said reinforcing ribs corresponding substantially to the circular arrangements of said recesses.

7. The invention of claim 6, wherein the base also has radial reinforcing ribs intersecting said circular ribs.

8. The invention of claim 7 wherein the retainer has on its upper surface an array of radial and concentric circular retainer reinforcing ribs corresponding substantially in layout to the ribs on the base, all of said recesses being formed in one of said circular and radial retainer reinforcing ribs.

* * * * *